United States Patent [19]

Speich

[11] Patent Number: 4,509,380

[45] Date of Patent: Apr. 9, 1985

[54] GEAR UNIT TRANSFORMING A UNIFORM DRIVER TO A NON-UNIFORM POWER TAKE-OFF

[75] Inventor: Francisco Speich, Gipf-Oberfrick, Switzerland

[73] Assignee: Textilma AG, Hergiswil, Switzerland

[21] Appl. No.: 333,476

[22] Filed: Dec. 22, 1981

[30] Foreign Application Priority Data

Dec. 30, 1980 [CH] Switzerland .......................... 9630/80

[51] Int. Cl.³ ............................................. F16H 35/02
[52] U.S. Cl. ........................................ 74/394; 74/63; 139/449
[58] Field of Search ........................... 74/63, 68, 394; 139/55.1

[56] References Cited

U.S. PATENT DOCUMENTS

| 1,727,194 | 9/1929 | Belin | 74/394 |
| 3,507,162 | 9/1970 | Nomura | 74/394 |
| 3,922,926 | 12/1975 | Bernardi | 74/63 |
| 4,393,902 | 7/1983 | Brock | 74/394 |

FOREIGN PATENT DOCUMENTS

| 2415778 | 4/1973 | Fed. Rep. of Germany . | |
| 2800835 | 6/1979 | Fed. Rep. of Germany . | |
| 27646 | 2/1982 | Japan | 74/394 |
| 3684 | of 1905 | United Kingdom | 74/104 |
| 932024 | 5/1982 | U.S.S.R. | 74/394 |

Primary Examiner—Kenneth J. Dorner
Attorney, Agent, or Firm—Toren, McGeady and Stanger

[57] ABSTRACT

In a gear unit for generating a non-uniform power take-off from a uniform drive, such as for the shedding mechanism of a weaving machine useful in a ribbon weaving machine, a driving member in the form of a driving cage is rotatably mounted on a power take-off shaft. A crankshaft is supported between two side walls of the driving cage and is connected to a planet pinion which is in meshed engagement with a stationary sun gear concentrically arranged around the power take-off shaft. A swing arm is secured on the power take-off shaft and a connecting element is hinged to the crankshaft and is connected by a bolt to the swing arm. The bolt is supported on both sides extending from the connecting element.

8 Claims, 10 Drawing Figures

GEAR UNIT TRANSFORMING A UNIFORM DRIVER TO A NON-UNIFORM POWER TAKE-OFF

SUMMARY OF THE INVENTION

The present invention is directed to a gear unit for generating a non-uniform power take-off from a uniform drive, such as for the shedding mechanism of a weaving machine useful in a ribbon weaving machine. The unit includes a rotatable power take-off shaft with a stationary sun gear coaxial with the shaft. A driving member is rotatably mounted on the power take-off shaft coaxial with the sun gear. The driving member is uniformly driven about the power take-off shaft. A crankshaft is mounted in the driving member and, in turn, is connected to a planet pinion which is in meshed engagement with the sun gear. The crankshaft includes a crank pin and a connecting element is connected to the crank pin and to a swing arm secured to the power take-off shaft.

A gear unit of the above type is disclosed in West German Offenlegungsschrift No. 24 15 778. In this patent publication, the driving member is mounted on an overhung driving shaft and the swing arm is mounted on an overhung power take-off shaft. In addition, the planet pinion and the crank pin are also supported in an overhung manner. Such an arrangement of the gear unit has certain disadvantages which limit the power to be transmitted as well as the service life of the unit. Because of the overhung arrangement of the driving shaft and the power take-off shaft, the power to be transmitted is limited to avoid bending of these shafts. The power take-off shaft carries a coaxial pin which engages into a coaxial bore in the driving shaft. This arrangement is not able to cancel the characeristic properties of the overhung support of the shafts, especially since due to the oscillating movement of the shafts the pin/bore connection is quickly worn out. The same is true of the overhung crank pin which is driven by the planet pinion. Further, this overhung arrangement leads to considerable wear which limits the driving force to be transmitted, it affects the accuracy of the gear unit, and the service life of the gear unit is considerably limited. Moreover, the wear experienced in the gear unit leads to undesirable noise development. Though a complicated gear unit construction is used, these disadvantages cannot be prevented.

In another known gear unit disclosed in German Offenlegungsschrift No. 28 00 835, a sun wheel is rigidly connected with the driving shaft and meshes with a planet pinion mounted on an intermediate shaft. An additional spur gear is secured on the intermediate shaft so that it rotates with the shaft and this spur gear is in meshed engagement with a spur gear on the driving shaft. Both the driving shaft and the power take-off shaft are overhung, they are arranged coaxially and together carry a U-shaped rocker in which the intermediate shaft is pivotally supported about the driving shaft and the power take-off shaft. The intermediate shaft is located outside the U-shaped rocker with a crank to which a connecting rod is hinged and is arranged to be pivoted on a stationary bolt.

In this known arrangement, the overhung support of the driving shaft and the power take-off shaft results in disadvantages which are still reinforced in that the driving shaft and the power take-off shaft must carry the heavy U-shaped rocker. Moreover, the construction of the gear unit is very complicated and is limited in its speed due to high eccentric inertia forces.

Therefore, it is the primary object of the present invention to provide a gear unit of the above-described type so that, in a simple and compact construction, it does not have the disadvantages experienced in the known units.

In accordance with the present invention, the driving member, in the form of a driving cage, has a pair of side walls spaced apart in the axial direction of the power take-off shaft. These side walls are rotatably mounted on the power take-off shaft. The crankshaft extends between and is supported on the side walls. The crankshaft is connected to the planet pinion. The connecting element is hinged to the crank pin of the crankshaft and it is connected to the swing arm by means of a bolt.

Since the driving member is in the form a driving cage with two side walls and the cage is rotatably supported on the power take-off shaft between two axially spaced bearings, a stronger gear unit construction is achieved by simple means so that a greater transmission of power over a longer service life of the gear unit is possible. Particularly, with the crankshaft supported by the side walls and the connecting element hinged to it, and with the bolt connecting the connecting element to the swing arm or rocker also supported at spaced positions, there is improved support for the gear unit parts.

Using the arrangement of the present invention, higher driving forces can be transmitted without play with the result that wear and constant noise development are avoided. Accordingly, a gear unit is achieved which guarantees at high transmission forces and high capacity nevertheless a high accuracy, low noise and long service life. These advantages are achieved in spite of the simple and compact construction of the gear unit. These advantages are gained though the construction of the gear unit is very simple.

In the driving cage an arcuate web extends between the side walls and is located on the opposite side of the axis of the driving member from the crankshaft so that the web affords an equalizing weight.

The swing arm secured to the power take-off shaft has a fork-shaped bearing part supporting the connecting bolt with the connecting element mounted on the bolt between the opposite sides of the fork-shaped part.

By providing a variable eccentricity for the crank pin in the crankshaft, it is possible to adapt the gear unit in a simple manner to different operating conditions. Additionally, the range of eccentricity can be changed by replacing the crankshaft.

There are a great variety of ways in which the driving member can be driven, for instance, using a spur gearing, a chain drive, a gear belt drive or the like. The use of a bevel gear drive with one bevel gear connected to the driving member provides a particularly desirous drive arrangement. The gear unit can be used for various purposes. It is particularly advantageous if the unit is used as the drive for the shedding mechanism in a weaving machine, particularly a ribbon weaving machine, and in such an arrangement it is especially advantageous if the power take-off shaft of the gear unit forms the shaft for the shedding mechanism.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
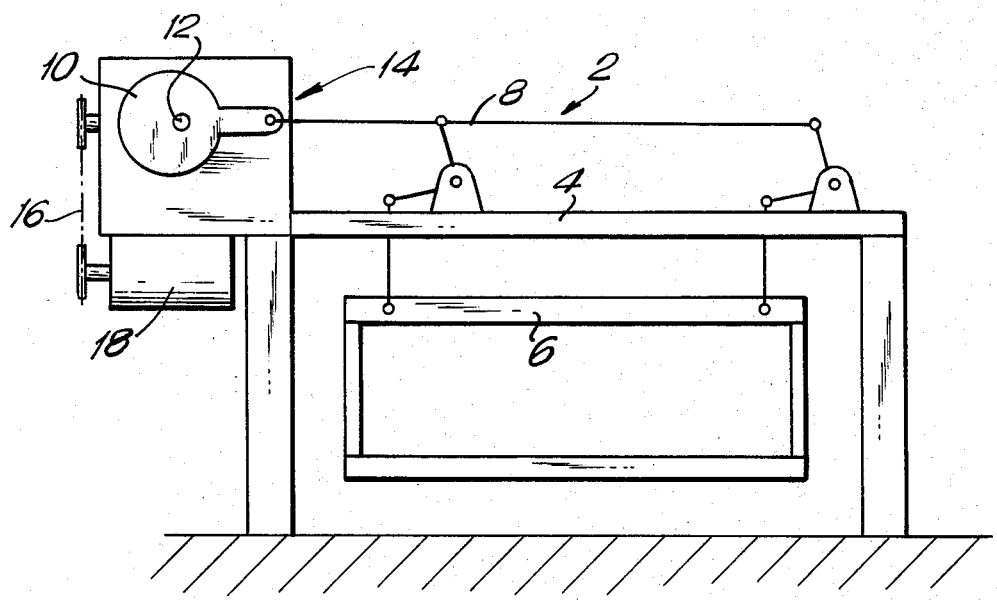
FIG. 1 is a schematic side view illustrating a gear unit driving a shedding mechanism for a weaving machine.
Figure 2:
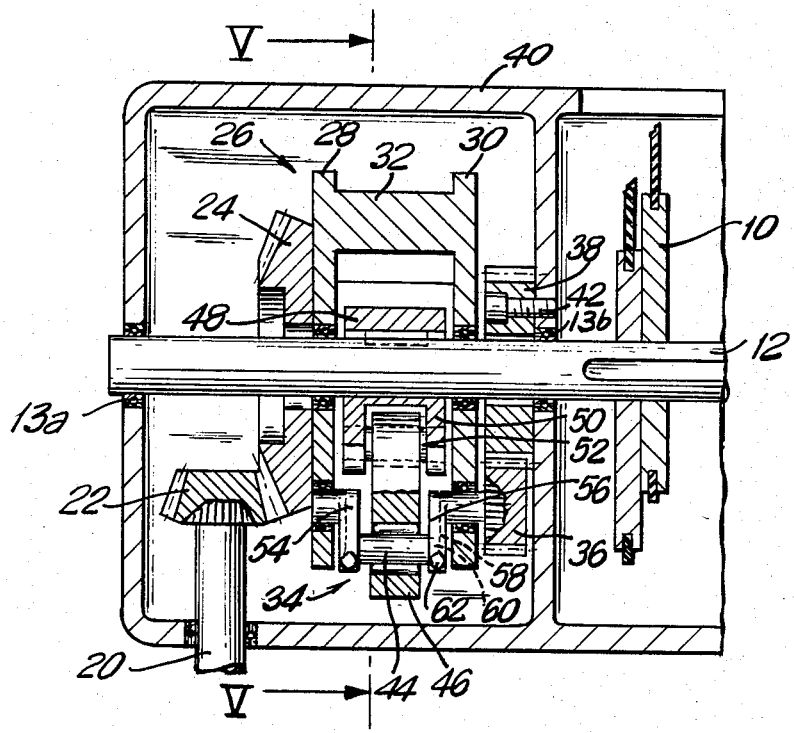
FIG. 2 is a sectional view of the gear unit shown in FIG. 1 taken along the line II—II in FIG. 5.

In FIG. 1 a shedding mechanism 2 of a weaving machine is shown schematically. The shedding mechanism 2 includes a structure 4 in which the shaft frames 6 are arranged with the frames being actuated by shaft raising elements 8. In turn, the shaft raising elements are connected to eccentrics 10 arranged on a shaft 12. Shaft 12 is the same as the power take-off shaft of the gear unit 14 which drives the shedding mechanism 2. Bearings 13a, 13b in housing 40 support the shaft 12 at axially spaced positions along the shaft. Gear unit 14 is driven via a chain drive 16 by a motor 18 or by another driving shaft of the weaving machine.

Figure 3:
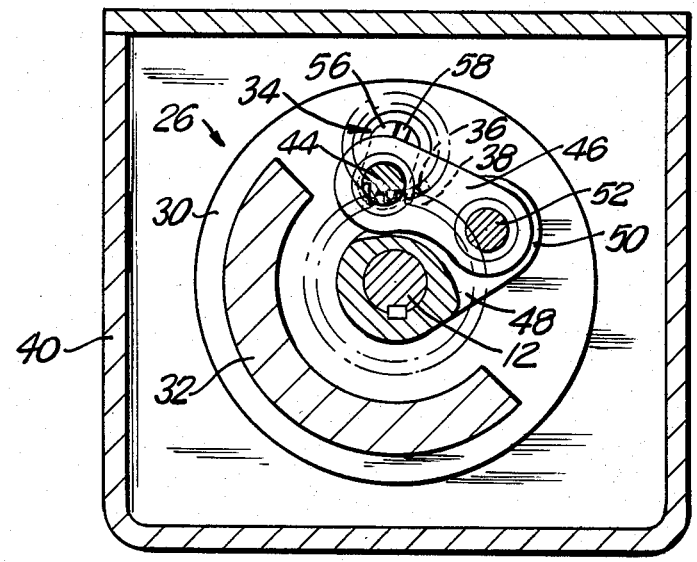
FIGS. 3 to 7 are transverse sectional views of the gear unit illustrated in FIG. 2 taken along the line V—V in FIG. 2 and displaying different operating positions of the gear unit.

Gear unit 14 is shown in detail in FIGS. 2 to 7. Driving shaft 20 is driven by the chain drive 16 and a bevel pinion 22 is located at the end of the driving shaft in meshed engagement with a bevel gear 24. Bevel gear 24 is secured on one outer side of a driving member 26 constructed as a driving cage. The cage-like driving member 26 includes a pair of side walls 28, 30 spaced apart in the axial direction of the power take-off shaft 12. Side walls 28, 30 are joined together by a web 32 which, as shown in FIG. 3, extends for approximately 180° around the driving member spaced radially outwardly from the power take-off shaft 12. Web 32 acts as an equalizing weight for the driving member. Side walls 28, 30 are rotatably supported on the power take-off shaft 12. On the opposite side of the side walls 28, 30 from the web 32, a crankshaft 34 is supported by the side walls and is connected to a planet pinion 36 located outside of the driving member 26 on the opposite side from the bevel gear 24. A housing 40 encloses the gear arrangement and a sun gear 38 is secured, in a stationary position, on the housing by means of screws 42. The planet pinion 36 is in meshed engagement with the sun gear 38. As mentioned above, crankshaft 34 is supported by and extends between the side walls 28, 30 with one end of the crankshaft projecting through side wall 30 and connected to planet pinion 36. Crankshaft 34 includes crank pin 44 located between the side walls 28, 30 with a connecting element 46 pivotally mounted on the crank pin at one end and connected in an articulated manner to a swing or rocking arm 48. The swing arm 48 is secured on the power take-off shaft so that it rotates with the shaft. The swing arm 48 has a fork-shaped bearing part 50 which provides support for both ends of a bolt 52 on which the connecting element 46 is articulated to the swing arm.

The eccentricity R of the crank pin 44 is variable. To change the eccentricity R side walls 54, 56 of the crank are provided with dovetail guide grooves 58 in which corresponding Vee guides 60 of the guide pin 44 are slidably supported. Clamping screws 62 fix the Vee guides 60 in the grooves 58 establishing the desired eccentricity of the crankshaft 34.

In the present embodiment, the planetary gearing is in the form of spur gearing with an externally toothed sun gear 38. It is possible, however, to provide a different form of planetary gearing, for instance, an internally toothed sun gear could be employed. Further, planetary gearing based on chain drives and gear drives are also possible. Advantageously, the planetary gearing has a transmission ratio of planet pinion to sun gear of 1:1 or 1:2. Accordingly, the power take-off speed in the first instance is superimposed with a full cycle of incremental velocity, while in the second case two cycles of incremental velocity are present, note FIGS. 9 and 10 for the transmission ratio 1:2.

Figure 4:
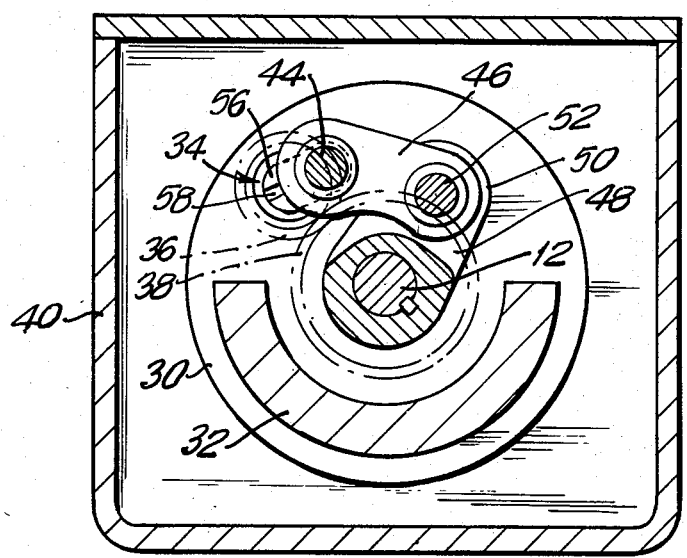
Figure 5:
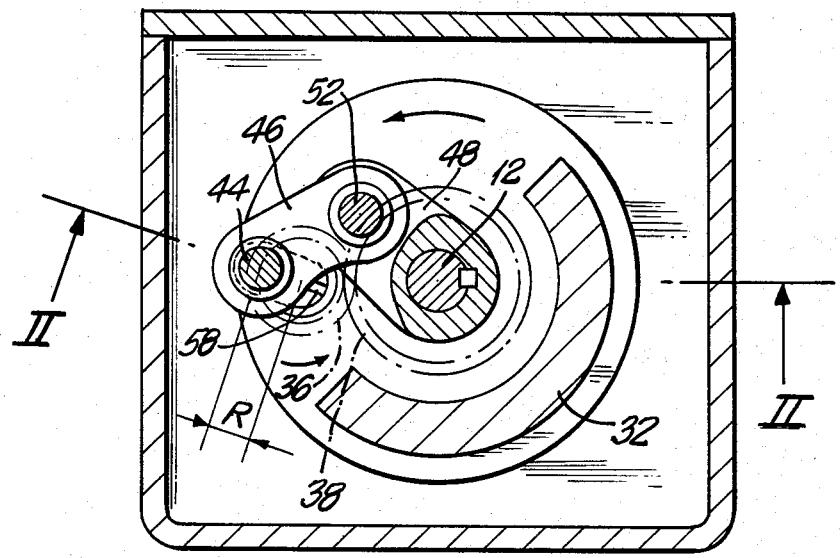
Figure 6:
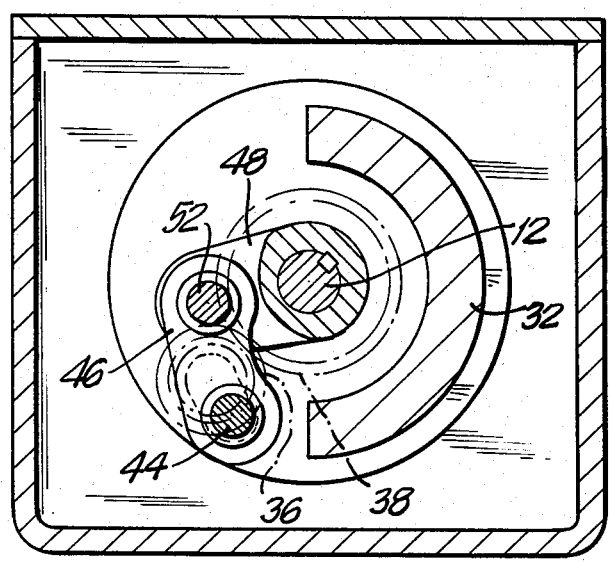
Figure 7:
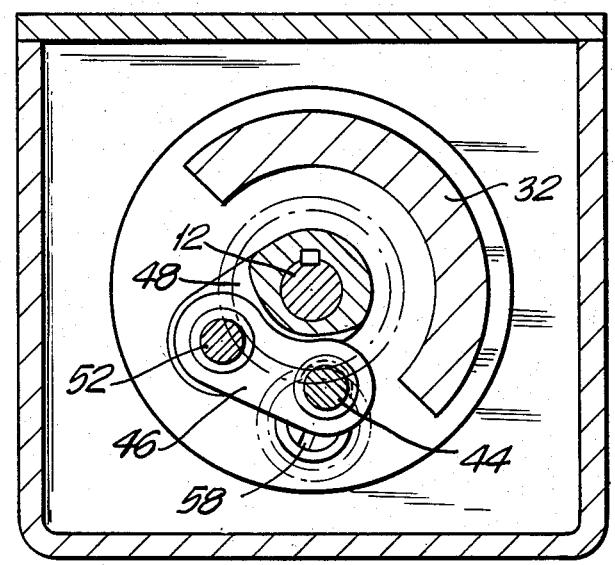

As indicated above, an incremental velocity is impressed on the power take-off speed of the power take-off shaft 12 by the crankshaft 34 driven by the planetary gearing 36, 38. During each cycle, the incremental velocity has a positive effect and a negative effect and, depending on the size of the crank radius, there may be a temporary stoppage of the driving shaft as shown in FIG. 10. The rotational position of the driving member is displayed in FIGS. 3 to 7. FIG. 3 corresponds to the angle of rotation of zero or 360° in the diagrams of FIGS. 9, 10 and in this position the largest oppositely directed motion is generated. In FIG. 4 the position of the angle of rotation is 45° and in this position the angular velocity of the driving members equals the angular velocity of the driving shaft. In the position shown in FIG. 5, the power take-off speed leads the driving speed corresponding to the angular position of 90° in diagrams 9, 10. FIG. 6 shows the angular position of 135° which is similar to that of 45° with the angular velocity of the power take-off shaft equalling the angular velocity of the driving member. In FIG. 7 the angular position is 180°, that is, diametrically opposite to that shown in FIG. 3.

Figure 8:
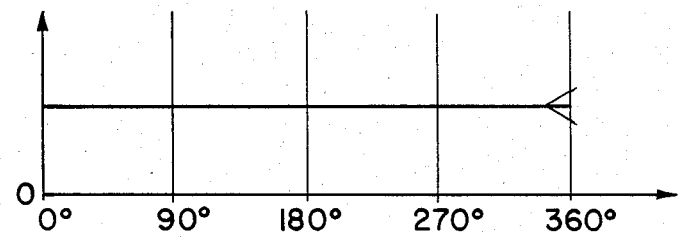
FIG. 8 is a diagram of the angular velocity of the power take-off shaft relative to the angular velocity of the driving member at a crank radius equal to zero.
Figure 9:
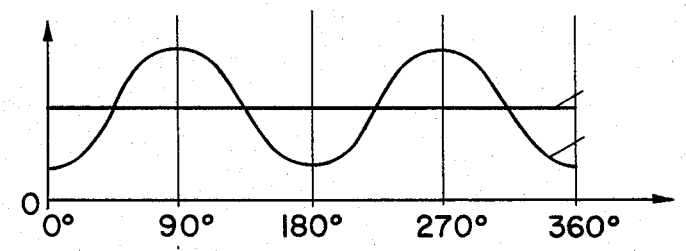
FIGS. 9 and 10 are diagrams with two angular velocities of the power take-off shaft relative to the angular velocity of the driving element based on the crank radius R setting.
Figure 10:
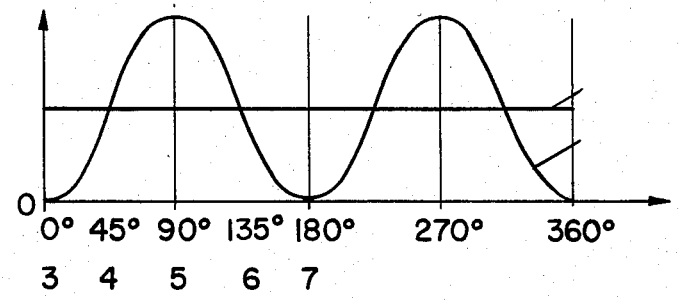

The difference in the velocity diagrams of FIGS. 9, 10 is based on the size of the crank eccentricity R when the crank eccentricity R equals zero, then the power take-off speed equals the driving speed as shown in FIG. 8. In the diagram of FIG. 9, a certain residual speed remains at the driving shaft. When the crank eccentricity is increased further, the power take-off shaft may periodically stop, as can be seen in the diagram of FIG. 10.

While specific embodiments of the invention have been shown and described in detail to illustrate the application of the inventive principles, it will be understood that the invention may be embodied otherwise without departing from such principles.

I claim:

1. A gear unit for generating a non-uniform power take-off from a uniform drive, such as for the shedding mechanism of a weaving machine useful in a ribbon weaving machine, comprising an axially extending rotatable power take-off shaft, a stationary sun gear coaxial with said power take-off shaft, a driving member rotatably mounted on said power take-off shaft and the axis of said driving member is coaxial with said sun gear, means for uniformly driving said driving member, a crankshaft mounted in said driving member, a planet pinion in meshed engagement with said sun wheel and connected to said crankshaft, said crankshaft including a crank pin, a swing arm connected to said power take-off shaft for rotation therewith, a connecting element connected to said crank pin and to said swing arm, wherein the improvement comprises that means for supporting said power take-off shaft comprising a pair of bearings spaced apart in the axial direction of said power take-off shaft said driving member is formed as a driving cage comprising a pair of side walls rotatably supported on and spaced apart in the axial direction of said power take-off shaft and located between said pair of bearings, said crankshaft extending between and supportably mounted in said side walls, said connecting element hinged to said crank pin of said crankshaft, and a bolt supported in said swing arm, said bolt connects said connecting element to said swing arm.

2. A gear unit, as set forth in claim 1, wherein said driving member includes a web extending between said side walls and acting as an equalizing weight, said crankshaft spaced radially outwardly from the axis of said driving member, and said web located on the opposite side of the axis of said driving member from said crankshaft.

3. A gear unit, as set forth in claim 1, wherein said swing arm includes a fork-shaped bearing part having a pair of support elements spaced apart in the axial direction of said power take-off shaft with said bolt secured within and extending between said supporting elements and said connecting element being articulated to said bolt between said supporting elements.

4. A gear unit, as set forth in claim 1, wherein said crankshaft has an axis and said crank pin has an axis eccentric to the axis of said crankshaft and the eccentricity of said crank pin in said crank shaft is variable.

5. A gear unit, as set forth in claim 4, wherein said crankshaft comprises a pair of crank side walls, means for securing said crank pin to said side walls for varying the eccentricity of said crank pin.

6. A gear unit, as set forth in claim 1, including a bevel gear drive for driving said driving member, said bevel gear drive including a bevel gear fixed to said driving member.

7. A gear unit, as set forth in claim 6, wherein said means for supporting said power take-off shaft comprises that a housing encloses said driving member, said sun gear secured in a stationary position on said housing, said sun gear located on the opposite side of said driving member from said bevel gear.

8. A gear unit, as set forth in claim 2, wherein said web is an arcuate member spaced radially outwardly from the axis of rotation of said driving member and extending for approximately 180° around the axis of said driving member.

* * * * *